US011994587B2

(12) United States Patent
Schenk et al.

(10) Patent No.: US 11,994,587 B2
(45) Date of Patent: May 28, 2024

(54) OPTOELECTRONIC DETECTION DEVICE, METHOD FOR THE OPERATION OF SUCH A DETECTION DEVICE, AND MOTOR VEHICLE WITH SUCH A DETECTION DEVICE

(71) Applicant: Valeo Schalter und Sensoren GmbH, Bietigheim-Bissingen (DE)

(72) Inventors: Jochen Schenk, Bietigheim-Bissingen (DE); Michael Kleiser, Bietigheim-Bissingen (DE); Frank Selbmann, Bietigheim-Bissingen (DE); Jürgen Nies, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 754 days.

(21) Appl. No.: 16/765,328

(22) PCT Filed: Nov. 26, 2018

(86) PCT No.: PCT/EP2018/082518
§ 371 (c)(1),
(2) Date: May 19, 2020

(87) PCT Pub. No.: WO2019/101990
PCT Pub. Date: May 31, 2019

(65) Prior Publication Data
US 2020/0355828 A1 Nov. 12, 2020

(30) Foreign Application Priority Data
Nov. 27, 2017 (DE) ...................... 10 2017 127 922.9

(51) Int. Cl.
*G01S 17/10* (2020.01)
*G01S 7/484* (2006.01)
(Continued)

(52) U.S. Cl.
CPC .............. *G01S 17/10* (2013.01); *G01S 7/484* (2013.01); *G01S 7/4865* (2013.01); *G01S 17/931* (2020.01)

(58) Field of Classification Search
CPC ..................................................... G01S 17/10
See application file for complete search history.

(56) References Cited

U.S. PATENT DOCUMENTS 9,383,753 B1 * 7/2016 Templeton ............. G01S 17/89
11,119,219 B1 * 9/2021 LaChapelle ........... H01S 5/0265
(Continued)

FOREIGN PATENT DOCUMENTS

DE 102015121578 B3 10/2016
EP 1876469 A1 1/2008
(Continued)

OTHER PUBLICATIONS

Google translation of European Patent Pub. No. EP 2955539B1 to Heinrch et al. that was filed in 2014.*
(Continued)

*Primary Examiner* — Jean Paul Cass
(74) *Attorney, Agent, or Firm* — Osha Bergman Watanabe & Burton LLP

(57) ABSTRACT

In an optoelectronic detection device (1) with at least one optical transmitting unit (3) with an electromagnetic pulse generator (4) for emitting electromagnetic emitted pulses (5), and at least one optical receiver for receiving reflected emitted pulses (7) that provides a reception signal, formed depending on the reflected emitted pulse, to an evaluation device (10), wherein the optical receiver (2) is configured to (Continued)

Figure 1:
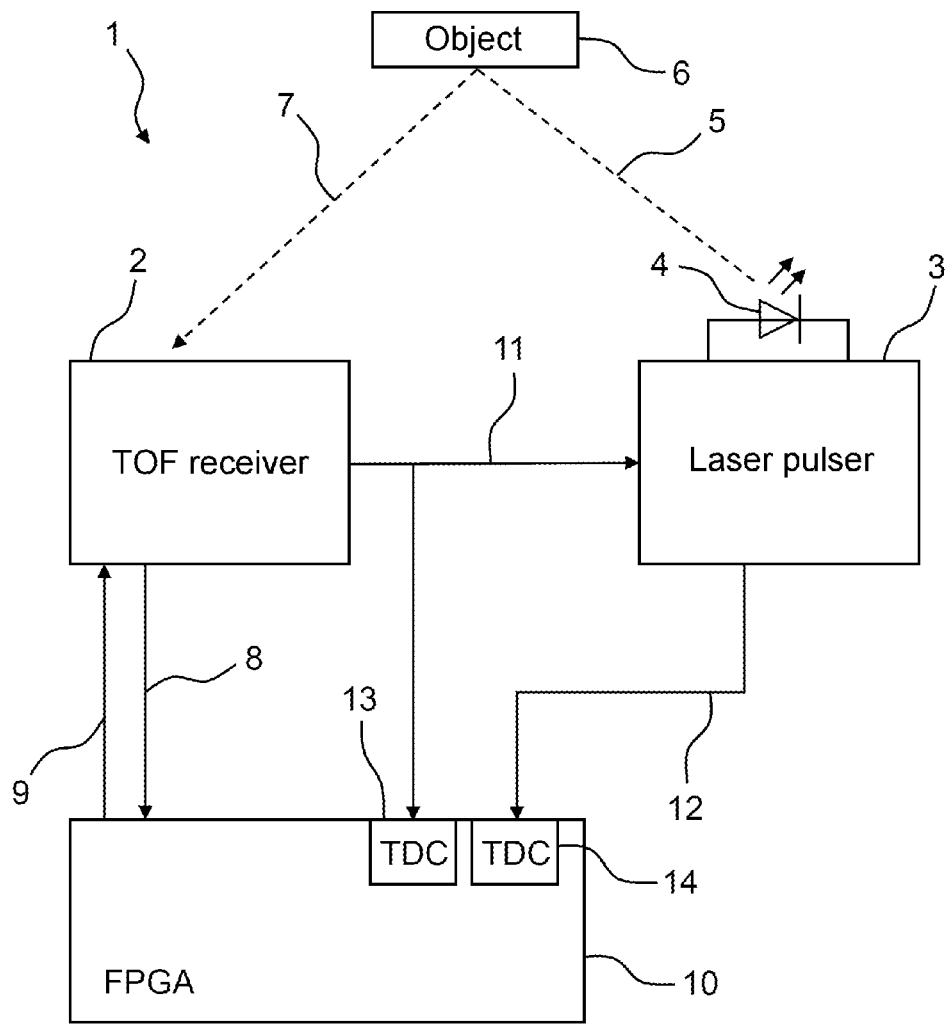

provide a trigger signal (11) for the control of the optical transmitter (3), an improved compensation of the optoelectronic detection device for errors resulting from temperature or ageing should be achieved. This is achieved in that the optical receiver (2) is configured to provide the trigger signal (11) to the evaluation device (10), the optical transmitter (3) is configured to provide a feedback signal (12) to the evaluation unit (10), wherein the feedback signal (12) corresponds to the time point of the transmission of the transmitted electromagnetic pulse (5) by the electromagnetic pulse generator (4), and the evaluation device (10) is configured to determine the time difference between the trigger signal (11) and the feedback signal (12).

7 Claims, 2 Drawing Sheets

(51) Int. Cl.
*G01S 7/4865* (2020.01)
*G01S 17/931* (2020.01)

(56) References Cited

U.S. PATENT DOCUMENTS

| | | | |
|---|---|---|---|
| 11,137,480 B2* | 10/2021 | Hall | G01S 17/06 |
| 2008/0186470 A1 | 8/2008 | Hipp | |
| 2021/0199770 A1* | 7/2021 | Gassend | G01S 17/10 |
| 2021/0199779 A1* | 7/2021 | Gassend | G01D 5/14 |
| 2021/0396844 A1* | 12/2021 | Wang | G01S 17/42 |
| 2022/0003846 A1* | 1/2022 | Massoud | G01S 7/484 |
| 2022/0018961 A1* | 1/2022 | O'Keeffe | G01S 17/10 |
| 2022/0120877 A1* | 4/2022 | Gassend | G01S 7/4868 |
| 2022/0146680 A1* | 5/2022 | Donovan | G01S 17/10 |

FOREIGN PATENT DOCUMENTS

| | | |
|---|---|---|
| EP | 2955539 A1 | 12/2015 |
| WO | 2016/121531 A1 | 8/2016 |
| WO | WO-2016121531 A1 * 8/2016 | G01C 3/06 |

OTHER PUBLICATIONS

Google translation of International Patent Pub. No. WO 2016/121531 A1 to Sharp.*

Csanyl, Nora et al., LiDAR Data Accuracy: the Impact of Pulse Repetition Rate, Department of Civil and Environmental Engineering and Geodetic Science1 Center for Mapping, The Ohio State University 1216 Kinnear Road, Columbus OH 43212-1154 (2006) (hereinafter "NORA").*

International Search Report and Written Opinion corresponding to International Application No. PCT/EP2018/082518, dated Feb. 27, 2019 (13 pages).

* cited by examiner

OPTOELECTRONIC DETECTION DEVICE, METHOD FOR THE OPERATION OF SUCH A DETECTION DEVICE, AND MOTOR VEHICLE WITH SUCH A DETECTION DEVICE

The present invention relates to an optoelectronic detection device with at least one optical transmitting unit with an electromagnetic pulse generator for emitting electromagnetic emitted pulses, and at least one optical receiver for receiving reflected emitted pulses that provides a reception signal, formed depending on the reflected emitted pulses, to an evaluation device, wherein the optical receiver is configured to provide a trigger signal for the control of the optical transmitter. The present invention also relates to a method for the operation of such an optoelectronic detection device. The present invention further relates to a motor vehicle with such a detection device.

In the motor vehicle field, various driver assistance systems are increasingly being used, that is to say electronic auxiliary devices for supporting the driver in specific driving situations. To detect objects in the surroundings of the motor vehicle, as well as for the measurement of distance or speed, optoelectronic detection devices that operate in accordance with the principle of "time-of-flight" (TOF) measurement are known.

For this purpose the detection device comprises at least one optical transmitting unit with an electromagnetic pulse generator for emitting electromagnetic emitted pulses into the surroundings. An optical receiver of the detection device comprises at least one photodetector for receiving reflected emitted pulses and for the provision of an electrical reception signal depending on the reflected emitted pulses. If, on the basis of the optoelectronic receiver, an evaluation device recognizes echoes or pulses in the received emitted pulses, these are fundamentally traced to reflections of the transmitted emitted pulses at target objects in the surroundings. The flight time between the emission and the reception of the echoes is proportional to the distance to the object. The distance from the object concerned is for example determined from the measurement of the flight time. The information determined by the detection device regarding objects in the surroundings of the vehicle is provided to a control device for the driver assistance system.

The term "LIDAR" ("light detection and ranging") refers to a measurement of the flight time using pulsed laser beams. The emitted pulses are here transmitted within an angular sampling range into the surroundings of the motor vehicle, and the surroundings thus scanned step-by-step.

Sampling optical measuring devices known as laser scanners are known from the prior art for vehicles for the detection of objects or obstacles in a monitored region; said devices determine the distance to objects or obstacles recognized in the monitored region using the light pulse flight time method.

In a laser scanner that uses a TOF receiver, the receiver also controls the pulser circuit, and thereby the laser diode. In this way it is possible to measure the time until the reflected light is received. The time that the reflected light has needed to reach the receiver again is measured, and converted into a distance value. This distance value is then made available to an evaluation device. A delay caused for example by the pulser circuit can be corrected as a systematic error. If this delay changes with for example temperature, extensive compensation tables are needed.

In the detection devices known from the prior art, it is disadvantageous that a changed behaviour of the detection device resulting from ageing of the pulser circuit or changes in temperature cannot be established. It is further disadvantageous that the TOF receiver does not obtain any feedback as to whether and when the laser light was sent out. Compensation of the error resulting from temperature or ageing is therefore not possible. Malfunctions in the detection device are, moreover, more poorly recognized, which leads to a reduction in the functional security.

On the basis of the above-mentioned prior art, the invention is thus based on the object of providing an optoelectronic detection device that permits an improved compensation of errors of the optoelectronic detection device resulting from temperature or ageing. A further object is that of increasing the functional security of the detection device.

The object is achieved according to the invention through the features of the independent claims. Advantageous embodiments of the invention are disclosed in the dependent claims.

Thus according to the invention an optoelectronic detection device is given with at least one optical transmitting unit with an electromagnetic pulse generator for emitting electromagnetic emitted pulses and at least one optical receiver for receiving reflected emitted pulses that provides a reception signal, formed depending on the reflected emitted pulses, to an evaluation device, wherein the optical receiver is configured to provide a trigger signal for the control of the optical transmitter, wherein the optical receiver is configured to provide the trigger signal to the evaluation device, the optical transmitter is configured to provide a feedback signal to the evaluation unit, wherein the feedback signal corresponds to the time point of the transmission of the transmitted electromagnetic pulse by the electromagnetic pulse generator, and the evaluation device is configured to determine the time difference between the trigger signal and the feedback signal.

The fundamental idea of the present invention is thus that of determining the difference between a trigger signal of an optical receiver and a feedback signal of an optical transmitter. The feedback signal makes it possible to establish whether and when an emitted pulse was sent out by the electromagnetic pulse generator. If, for example, there is no feedback signal after the trigger signal, no emitted pulse was sent out, and there is a malfunction that should be recognized in the context of functional security. A temperature dependency or ageing of the optical transmitter circuit that may be present can be recognized from the difference between the trigger signal and the feedback signal and compensated for. Delays in emitting the emitted pulse in the transmitter circuit can be registered.

In an advantageous embodiment of the invention, the optical transmitting unit is a laser transmitter. Lasers have the advantage that they deliver a sharper image with an improved resolution in comparison with other transmitter units.

In a further advantageous embodiment of the invention, the electromagnetic pulse generator is a laser diode. The advantage of laser diodes or semiconductor lasers is that they can be produced with very small dimensions in large quantities, and are therefore economically. Since semiconductor lasers are electrically pumped, they can be integrated very well into electrical systems, and in addition have a long service life.

In a further advantageous embodiment of the invention, the optical transmitting unit is designed to carry out a current measurement on the laser diode, and to provide the feedback signal on the basis of the measurement of a current through the laser diode. It is advantageous for the provision of the feedback signal on the basis of a measurement of a current through the laser diode that the measurement of the current corresponds without delay to the emission of the light, and thus supplies a simple possibility for determining the precise time point of the transmission of the transmitted electromagnetic pulse by the electromagnetic pulse generator.

In one advantageous embodiment of the invention, the optoelectronic detection device is designed to determine a flight time of the transmitted electromagnetic pulse between the transmitter and the receiver on the basis of the time difference between the time point of the emission of the transmitted electromagnetic pulse and the time point of the reception of the reflected emitted pulse.

In one advantageous embodiment of the invention, the determination of the time difference between the trigger signal and the feedback signal is performed by means of at least one time-to-digital converter. Time-to-digital converters are electronic assemblies that can measure short time intervals and convert them into a digital output. By means of time-to-digital converters very precise measurements of time difference are possible, and these permit an improved compensation of the errors and a more accurate determination of the distance.

In a further advantageous embodiment of the invention, one time-to-digital converter is provided for the trigger signal and one time-to-digital converter for the feedback signal. The provision of a plurality of time-to-digital converters has the advantage that the measurement of the time intervals of the signals can take place independently of one another.

In one advantageous embodiment of the invention, the evaluation unit is a field-programmable gate array. Field-programmable gate arrays, also known as FPGAs for short, have the advantage that logical circuits can be implemented with them easily, quickly and flexibly. FPGAs furthermore offer the advantage that individual functions can be integrated subsequently, and an easy adaptation to changed specifications can therefore take place.

In a further advantageous embodiment of the invention, the at least one time-to-digital converter is implemented in the field-programmable gate array. Through the implementation of the time-to-digital converter in the FPGA, no external circuits with further components are required, and an easy adaptation of the circuit is permitted.

The present invention also relates to a method for the operation of a detection device, wherein the following steps are comprised:
  emitting a start signal from the evaluation device to the optical receiver emitting a trigger signal from the optical receiver to the optical transmitter after reception of the start signal measuring the time from the start signal to the arrival of the trigger signal in the evaluation device transmitting of the transmitted electromagnetic pulse after reception of the trigger signal transmitting of a feedback signal that corresponds to the time point of the transmission of the transmitted electromagnetic pulse measuring of the time from the start signal to the arrival of the feedback signal in the evaluation device determining the difference between the trigger signal and the feedback signal The present invention further relates to a motor vehicle with an optoelectronic detection device according to one the claims.

The invention is explained in more detail below with reference to the attached drawing and on the basis of preferred embodiments. The features presented can represent an aspect of the invention both in each case individually and in combination. Features of different exemplary embodiments can be transferred from one exemplary embodiment to another.

Figure 2:
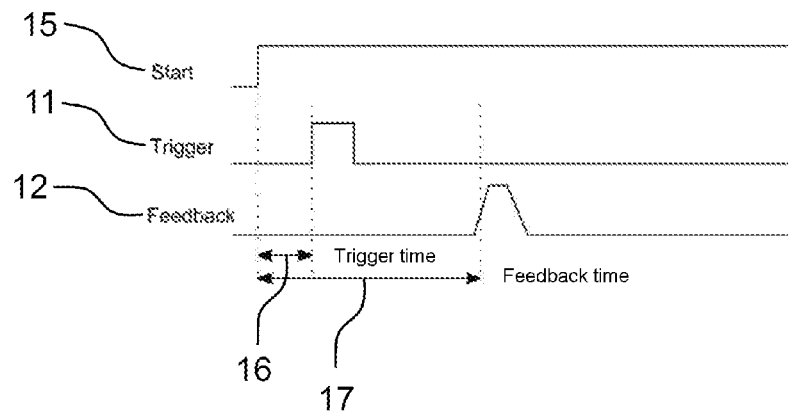
Figure 3:
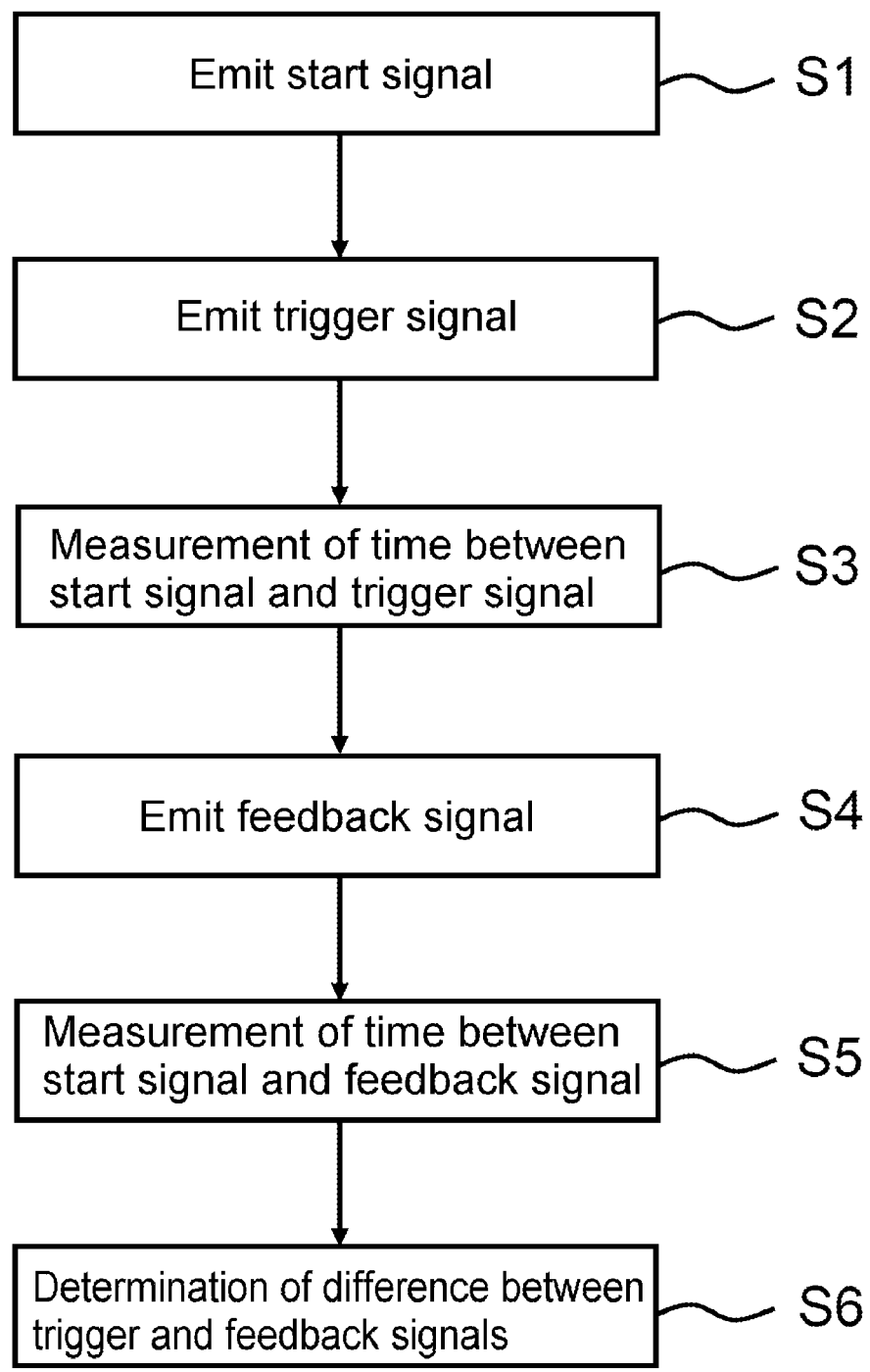

Here:

FIG. 1 shows a schematic view of an exemplary embodiment of an optoelectronic detection device FIG. 2 shows a graphical illustration of an exemplary embodiment for the start signal, trigger signal and feedback signal of an optoelectronic detection device FIG. 3 shows a flow chart of an exemplary embodiment of a method for operating an optoelectronic detection device FIG. 1 shows a schematic view of an exemplary embodiment of an optoelectronic detection device 1. The detection device 1 comprises a time-of-flight (TOF) receiver 2 and an optical transmitting unit 3 with a laser diode 4.

A laser pulse 5 is sent out by means of the laser diode 4, reflected from an object 6, and registered by the TOF receiver 2. Since the laser pulse 5 covers the path twice, a time of 6.67 ns corresponds to precisely 1 m. It is therefore particularly important that the transmitter 3 and receiver 2 are synchronized in advance. The TOF receiver 2 therefore controls the optical transmitting unit 3 with the electromagnetic pulse generation 4, and thereby the laser diode 4, by means of a trigger signal 11. In this way it is possible to measure the time until the reflected light 7 is received. The time that the reflected light 7 has required to reach the receiver 2 again is measured, and converted into a distance value. This distance value is then made available to the evaluation device. The trigger signal 11 is also made available to the evaluation device 10.

The TOF receiver 2 is connected to an evaluation device 10 by a line for a control signal 9 and a line for a data signal 8. In one embodiment of the invention, the evaluation device 10 is an FPGA. In one preferred embodiment, the trigger signal 11 is taken to a time-to-digital converter 13 implemented in the FPGA 10.

The optical transmitting unit 3 makes a feedback signal 12 available which indicates the precise time point of the transmission of the laser pulse 5. The measurement of the transmission of the laser pulse 5 can for example be done by a current measurement of the laser diode 4, since this corresponds to a delay-free determination of the transmission of the laser pulse 5. In order to keep disturbances on the feedback signal 12 small, it can also be provided that the feedback circuit is configured differentially. The feedback signal 12 is also taken to a TDC 14 implemented in the FPGA 10. The feedback signal 12 will here arrive at the FPGA 10 somewhat later than the trigger signal 11. By means of the difference between the time point of the trigger signal 11 and of the feedback signal 12, the previously determined distances can, if appropriate, be corrected.

In one embodiment it can also be provided that the laser pulses 5 sent out by the optical transmitting unit 3 are deflected by a mirror. A check of the delay in the TOF receiver 2 can here be carried out through the difference measuring by means of the feedback signal 12. The position of the deflection mirror is determined here in the FPGA 10, and the next measuring time point is calculated. A start signal 21 is then sent from the FPGA 10 to the receiver 2, and the two TDCs 13, 14 for the trigger signal 11 and the feedback signal 12 are started at the same time.

The receiver sends the trigger signal 11 to the optical transmitting unit 3, and the time until the trigger signal 11 is determined by means of a TDC 13 in the FPGA 10. This allows a direct check of whether the trigger signal 11 has arrived within the permitted time window.

The feedback signal 12 transmitted by the optical transmitting unit 3 will arrive and be measured somewhat later in the second TDC 14 at the FPGA 10. The feedback signal 12 is checked for its presence, time point and duration. If the time point of the feedback signal 12 is not at the pre-calculated value, the measurement must be discarded, since the laser beam 5 has been deflected to an incorrect position by the mirror. At the end of the measurement, the receiver 2 transfers the measured distance values. By means of the difference between the time point of the trigger signal 11 and of the feedback signal 12, the previously determined distances can, if appropriate, be corrected.

FIG. 2 shows a graphical illustration of an exemplary embodiment for the start signal 15, trigger signal 11 and feedback signal 12 of an optoelectronic detection device 1. A start signal 15 is sent from the FPGA 10 to the receiver 2, and the two TDCs 13, 14 for the trigger signal 11 and the feedback signal 12 are started at the same time. The receiver 2 passes the trigger signal 11 on to the optical transmitting unit 3. The time from the start signal 15 until the trigger signal 11 is determined by means of a TDC 13 in the FPGA 10, and indicates the trigger time 16. The feedback signal 12 will arrive and be measured somewhat later in the second TDC 14 at the FPGA 10. The time from the start signal 15 to the feedback signal 12 yields the feedback time 17. By means of the measurement of the time difference between the trigger time 16 and the feedback time 17, errors resulting from temperature or ageing can be compensated, and the measurement of the distances is improved.

FIG. 3 shows a flow chart of an exemplary embodiment of a method for operating an optoelectronic detection device In step S1 a start signal is sent from the FPGA 10 to the receiver 2, and the two TDCs 13, 14 that are implemented in the FPGA for the trigger signal 11 and the feedback signal 12 are started at the same time.

In step S2, the receiver 2 sends the trigger signal 11 to the optical transmitting unit 3 and the FPGA 10.

In step S3, the time between the start signal 15 and the arrival of the trigger signal 11 at the FPGA 10 is determined by means of the TDC 13. This allows a direct check of whether the signal has arrived within the permitted time window.

In step S4, the feedback signal 12 is transmitted by the optical transmitting unit 3, wherein the feedback signal 12 is based on a measurement of a current through the laser diode 4. The measurement of the current corresponds here to the delay-free emission of the laser pulse 5.

In step S5, the time between start signal 15 and feedback signal 12 arriving at the second TDC 14 in the FPGA 10 is measured.

In step S6, the difference between the time measurement between the start signal 15 and the trigger signal 11 and the time measurement between the start signal 15 and the feedback signal 12 is determined. Temperature-dependent or ageing-dependent errors can be determined from the difference between the time measurements and compensated, whereby it is possible that the distances determined previously can be corrected.

LIST OF REFERENCE SIGNS

1 Detection device
2 Optical receiver
3 Optical transmitting unit
4 Electromagnetic pulse generator
5 Transmitted electromagnetic pulse
6 Object
7 Reflected emitted pulse
8 Data signal
9 Control signal
10 Evaluation device
11 Trigger signal
12 Feedback signal
13 Trigger signal time-to-digital converter
14 Feedback signal time-to-digital converter
15 Start signal
16 Trigger time
17 Feedback time

The invention claimed is:

1. An optoelectronic detection device comprising:
at least one optical transmitter with an electromagnetic pulse generator for emitting electromagnetic emitted pulses; and
at least one optical receiver for receiving reflected emitted pulses that provides a reception signal, formed depending on the reflected emitted pulses, to an evaluation device,
wherein the at least one optical receiver is configured to provide a trigger signal for control of the optical transmitter to the evaluation device,
wherein the at least one optical transmitter is configured to provide a feedback signal to the evaluation device, wherein the feedback signal corresponds to a time point of a transmission of the emitted electromagnetic pulse by the electromagnetic pulse generator,
wherein the evaluation device is configured to determine a time difference between the trigger signal and the feedback signal,
wherein the electromagnetic pulse generator is a laser diode,
wherein the optical transmitter is configured to carry out a current measurement of a current through the laser diode, and to provide the feedback signal on a basis of the current measurement,
wherein the evaluation device is a field-programmable gate array in which at least one time-to-digital converter is implemented.

2. The detection device according to claim 1, wherein the optical transmitter is a laser transmitter.

3. The detection device according to claim 1, wherein the optoelectronic detection device is configured to determine a flight time of a transmitted electromagnetic pulse between the optical transmitter and the optical receiver on a basis of the time difference between the time point of an emission of the transmitted electromagnetic pulse and the time point of the reception of the reflected emitted pulse.

4. The detection device according to claim 1, wherein the determination of the time difference between the trigger signal and the feedback signal is performed by the at least one time-to-digital converter.

5. The detection device according to claim 4, wherein the at least one time-to-digital converter is provided for the trigger signal and the at least one time-to-digital converter for the feedback signal.

6. A method for operation of a detection device according to claim 1, the method comprising:
emitting a start signal from the evaluation device to the optical receiver;
emitting a trigger signal from the optical receiver to the optical transmitter after reception of the start signal;
measuring the time from the start signal to an arrival of the trigger signal in the evaluation device;
transmitting a transmitted electromagnetic pulse after reception of the trigger signal;

transmitting a feedback signal that corresponds to the time point of the transmission of the transmitted electromagnetic pulse;

measuring the time from the start signal to the arrival of the feedback signal in the evaluation device; and determining the difference between the trigger signal and the feedback signal.

7. A motor vehicle with the optoelectronic detection device according to claim 1.

\* \* \* \* \*